United States Patent [19]
Kawashima et al.

[11] 3,879,057
[45] Apr. 22, 1975

[54] SAFETY GAS BAG STRUCTURE

[75] Inventors: Takayoshi Kawashima, Akio Tange, Seiichi Yamamoto, all of Nagoya; Takashi Baba, Yutaka Kondo, both of Toyota; Choji Nozaki, Nagoya; Toshihiko Sakai, Kasugai, all of Japan

[73] Assignees: Toyoda Boshoku Kabushiki Kaisha; Toyota Jidosha Kogyo Kabushiki Kaisha; Kabushiki Kaisha Toyota Chuo Kenkyusho, all of Aichi-ken, Japan

[22] Filed: Feb. 26, 1973

[21] Appl. No.: 336,010

[30] Foreign Application Priority Data
Feb. 28, 1972 Japan.............................. 47-20434

[52] U.S. Cl. .......................................... 280/150 AB
[51] Int. Cl. ............................................... B60r 21/10
[58] Field of Search .......... 280/150 AB; 244/138 R, 244/31; 188/1 C; 9/316

[56] References Cited
UNITED STATES PATENTS

| | | | |
|---|---|---|---|
| 2,418,798 | 4/1947 | Whitmer.................. | 280/150 AB X |
| 2,974,912 | 3/1961 | Namsick ........................ | 244/138 R |
| 3,229,932 | 1/1966 | Yost................................ | 244/31 |
| 3,451,693 | 6/1969 | Carey ........................ | 280/150 AB |
| 3,451,694 | 6/1969 | Hass .............................. | 280/150 AB |
| 3,476,402 | 11/1969 | Wilfert ........................ | 280/150 AB |
| 3,586,347 | 6/1971 | Carey et al................. | 280/150 AB |
| 3,614,127 | 10/1971 | Glance ........................ | 280/150 AB |
| 3,656,791 | 4/1972 | Truesdell..................... | 280/150 AB |

*Primary Examiner*—Kenneth H. Betts
*Attorney, Agent, or Firm*—Hill, Gross, Simpson, Van Santen, Steadman, Chiara & Simpson

[57] ABSTRACT

A gas bag of high safety, responsibility and stability for a gas bag device attached to a high speed moving apparatus comprises a hollow bag body, a gas introducing hole means, at least one exhausting hole means, at least one restraining member provided in the hollow bag body for restraining the free deformation of said hollow bag body due to the pressing of the occupant in the inflated condition, at least one blocking member provided in said hollow bag body and connected to said restraining member for blocking said opening of said exhausting hole means, thereby to exhaust the gas from said hollow bag body through said exhausting hole means by releasing said blocking member from blocking said opening of said exhausting hole means, which device remarkably reduces the pressure of the gas in said hollow bag body and the rebounding force of said hollow bag body against the occupant, at the moment when the occupant presses said inflated bag body in a sudden stop of said moving apparatus.

27 Claims, 9 Drawing Figures

3,879,057

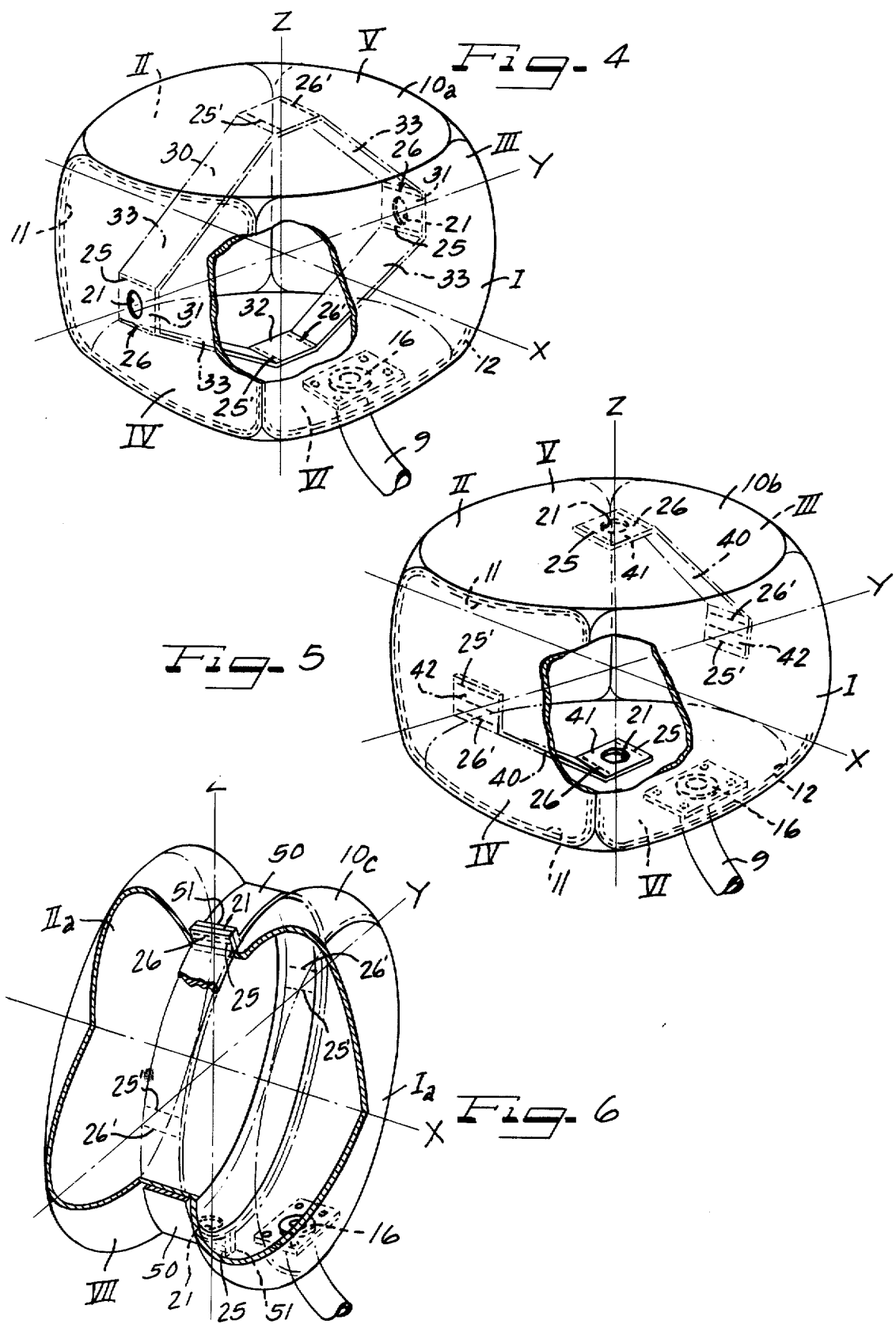

SAFETY GAS BAG STRUCTURE

BACKGROUND OF THE INVENTION

The present invention relates to a gas bag device, and especially to the improvement of the construction of the gas bag itself.

In case of a sudden stop, such as when a collision of automobiles or the like occurs, there is the danger that the occupants will be thrown against the steering wheel, or the dash board, or the back part of the front seat, and that because of this, their heads, breasts, and the like, may be hurt. A gas bag system has been known and employed for preventing such injuries as described above.

In the conventional gas bag safety device, a bag body has been formed of a sheet of filament textile, plastic, and the like, having substantially no air permeability and elasticity, and its inner part has been made to be hollow so that high pressure gas could be injected thereinto. Such a gas bag (or air bag as they are sometimes called) has been, in the usual case, folded without the high pressure gas therein and housed in a steering wheel portion, a dash board or the back part of the front seat of an automobile or the like in the deflated condition. The hollow inner part of the gas bag was connected with a high pressure gas container mounted on the automobile, through a high pressure gas supplying path. Just before or at the time of the sudden stop of the automobile or the like, a detector attached to the automobile body was operated, and the high pressure gas in the gas container was rapidly supplied into the gas bag by opening a valve hole of the high pressure gas container so that the gas bag was rapidly inflated in front of the occupant. Thus, the occupant was prevented from being thrown forwardly and the body of the occupant was protected. In this case, the maximum acceleration of the motion of the occupant was limited within the permitted limit, for example, not more than 60G (G being gravity acceleration), and lessened the extent the occupant might be hurt.

However, this kind of conventional gas bag device has disadvantages. Namely, in case of a sudden stop or collision of the automobile or the like, as the gas bag system starts to inflate the bag body, an occupant touching the inflated gas bag under the influence of inertial forces presses the gas bag in and thus deforms the gas bag. The pressure of the high pressure gas in the deformed gas bag is thus increased, and when the inner pressure of this gas bag reaches a predetermined maximum pressure, the relative speed of the occupant comes to zero. The pressure and energy stored in the bag body is then changed to a rebounding force by the gas bag. The danger is then that the occupant is rebounded by this rebounding force and may be thrown against various structures in the automobile and may be hurt. Therefore, it is one of the important problems to be resolved to prevent the occupant from being hurled back by the rebounding force of the gas bag.

Conventionally, as the means to prevent the rebound of the occupant, the gas bag was provided with a valve of the occupant, the gas bag was provided with a valve device such as an escape valve in the sealed wall surface thereof. The said valve is designed to operate automatically when the high pressure gas packed in the gas bag reaches a predetermined value pressed by the occupant and thereupon to exhaust the high pressure gas outward from the inner part of the hollow bag body for lowering the inner pressure thereof. But in the case of such gas bags the air tight characteristics at the connecting parts of the valve device and the wall surfaces are easy to damage. The high pressure gas is leaked from the hollow bag body through the connecting parts, so the gas bag can't be inflated sufficiently, and the gas bag doesn't operate satisfactorily. And also, there are many defects from a practical standpoint in the use of the conventional gas bag such that the construction of the gas bag becomes to be complicated, and that the cost of the said gas bag becomes to be higher.

SUMMARY OF THE INVENTION

According to the present invention, the said problem can be resolved by improving the construction of the gas bag which is employed for the conventional gas bag device. Namely, with respect to the gas bag of the present invention, a hollow bag body is formed of sheet material having substantially no air permeability and elasticity and provided with a gas introducing hole connecting with the high pressure gas supplying source at some portion of the bag body and with at least one gas exhausting hole passing through the wall of the bag body being disposed at a different part of the hollow bag body from the part where the gas introducing hole is located. The said gas exhausting hole is blocked in an air tight condition ith the blocking member made of the material of substantially no air permeability and elasticity, so that the said blocking member can be opened when a predetermined force is applied thereto. A restraining member is connected or formed in one body with the said blocking member and is connected with a portion of the wall of the said hollow bag body at the other end thereof. The length of the said restraining member is made to be nearly equal to or shorter than that of the line along the wall surface of the said bag body connecting the joining points of both ends of the restraining member to the bag body in the condition when the gas bag body is inflated by introducing the high pressure gas. (Hereafter, this condition will be called the "free expansion condition.")

The structural features of the gas bag of the present invention will now be referred to. When the gas bag of the present invention is deformed after the high pressure gas is introduced into it, the tensile force operating on the said restraining member exceeds the predetermined value to the extent that the said blocking member is peeled from the said hollow bag body and the gas exhausting hole is made to be open so as to let the high pressure gas escape from the inner part of the hollow bag body. Hence, the rebounding force against the occupant, is reduced by means of lowering the inner pressure of the said hollow bag body.

In case that the gas bag of the present invention is provided in an automobile or the like, it is necessary to adjust the direction of the axis along which said restraining member is constructed so as to be perpendicular to the pressing direction of the occupant on the bag body when the sudden stop of the automobile and the like occurs and the high pressure gas is introduced and packed into the hollow bag body. And then the inner pressure of the said hollow bag body can be lowered remarkably by peeling operation of the said blocking member from the said hollow bag body and causing the gas exhausting hole to open to exhaust outward the high pressure gas from the inner part of the hollow bag body.

If the gas bag of the present invention is constructed so that the direction of the outer force applied to the said gas bag in the free inflated condition, that is, the pressing direction of the occupant to the bag body, is made to be perpendicular to the longitudinal direction of the restraining member, with a sudden stop of the automobile and the like, the pressure of the high pressure gas in the bag body is gradually increased as the gas bag is deformed by being pressed by the occupant under the influence of the inertial forces. But at this time, the free deformation of the bag body (that is, the free enlargement of the volume of the bag body) due to the increase of the inner pressure thereof is restrained by means of the restraining member. As the result, the tensile force operating in the longitudinal direction of the restraining member is increased. And when the inner pressure of the gas bag reaches a predetermined value, the tensile force of the bag body is increased, and this is applied to the restraining member, the blocking member connected or formed in one body with the restraining member is peeled from the hollow bag body and the gas exhausting hole is made to be open. Thus, the rebounding force of the bag body is effectively reduced. As its result, the rebound of the occupant can be remarkably reduced compared with the case that the conventional gas bag on which the gas exhausting hole is not provided.

In this connection, the present inventors have carried out experiments with both the gas bag of the present invention (the gas bag of the first embodiment which will be described hereafter), and the conventional gas bag (the gas bag similar to the present invention except that the gas exhausting hole and the restraining member are not provided). According to the result of the experiments, the rebounding energy of the gas bag of the present invention can be decreased to about one third of that of the conventional gas bag (the coefficient of the rebound of the conventional gas bag is 0.91, but that of the gas bag of the present invention is 0.50).

The conventional gas bag is compared with the gas bag of the present invention in FIG. 2 by taking the inner pressure of each gas bag for the ordinate and the displacement of the distance between the mutually opposing surfaces (the distance between the front panel and the back panel) in the direction of the deformation of the bag body caused by the outer force of the gas bag for the abscissa. When the conventional gas bag is deformed, pressed by the occupant, the high pressure gas in the bag body is increased along the curve A as the bag body is deformed, and after the decrement of the distance of the mutually opposing wall surfaces in the pressing direction of the occupant to the hollow bag body, the force becomes a minimum at the point B. The said distance begins to increase by means of energy of the inner pressure of the gas bag, and at the same time, gas pressure in the bag body is converted to kinetic energy by which the occupant is rebounded in the reverse direction against the pressing direction of the occupant to the hollow bag body, and then the inner pressure of the gas bag is lowered along the curve C. In other words, in case of the conventional gas bag both the energy of the inner pressure and the tensile force of the bag body are shown by the area OABFO, and the energy corresponding to the area BCHF is converted to the kinetic energy by which the occupant is sprung in a reverse direction against the pressing direction of the occupant to the hollow bag body.

On the contrary, in the case where the gas bag of the present invention is deformed, pressed by the occupant, the pressure of the high pressure gas in the bag body is increased along the curve A' as the bag body is deformed. The increment of this inner pressure operates as the increment of the tensile force which stretches the restraining member thereof. Some part of the blocking member is designed to be peeled when the inner pressure of the gas bag reaches to the point D. By the partial peeling operation of the blocking member, the kinetic energy rebounding the occupant in the reverse direction against the pressing direction of the occupant to the hollow bag body, can be absorbed, and at the same time, the inner pressure of the gas bag is made to be lowered. But the said inner pressure is again increased as the successive deformation of the gas bag in the pressing direction of the occupant to the hollow bag body. At the time when the gas pressure in the gas bag reaches the predetermined point D', some part of the rest of the blocking member is peeled and as the result that the gas exhausting hole, blocked with the blocking member until the said time is made to be open, the high pressure gas in the hollow bag body is exhausted outward through the said gas exhausting hole. By means of both the lowering of the inner pressure of the gas bag based on the gas exhausting from the said hollow bag body and the energy absorbing effect caused by the peeling operation of the said blocking member from the hollow bag body, the absorption of the kinetic energy, rebounding the occupants toward the reverse direction against the pressing direction thereof to the hollow bag body can be reduced. Namely, the inner pressure of the gas bag is lowered along the curve E from the said point D' (the situation that the gas exhausting hole is open), and it reaches the point D' when the occupants arrive at the most progressive position in the pressing direction to the bag body (in FIG. 2, the position corresponding to the displacement of the gas bag as shown with G), and after this process, it is lowered along the curve E'. And therefore, in case of the gas bag of the present invention, out of the inner pressure energy shown with the area OA'DD'ED'' GO, the kinetic energy applied to the occupants is only the inner pressure energy corresponding to the area D''E'JG.

It is apparent from the comparison of this area D''E'JG with the corresponding area BCHF in case of the said conventional gas bag, that the rebounding energy of the gas bag by which the occupant is rebounded backward of the seat is remarkably reduced in case of the gas bag of the present invention compared with the conventional gas bag.

And furthermore, the volume of the gas bag of the present invention can be made to be smaller than that of the conventional gas bag by that restrained by the restraining member. Therefore, the packing period of the high pressure gas can be made short compared with the case of the conventional gas bag, and also, the volume of the gas cylinder as the high pressure gas supplying source can be made to be small. So this type of the gas bag device can be put to practical use in such a field as the case of the automobiles, where the right weight and high speed device of which safety device operates rapidly and certainly in the emergent situation of the occupants, is required.

Accordingly, it is an object of the present invention to provide a novel and useful gas bag.

Another object of the present invention is to provide a gas bag having high safety, responsibility and stability.

Another object of the present invention is to provide a gas bag comprising a hollow bag body, a gas introducing hole means, a gas exhausting hole means, a restraining member provided in the hollow bag body for restraining the free deformation of said hollow bag body due to the pressing of the occupant in the inflated condition and a blocking member provided in said hollow bag body and connected to said restraining member for blocking said exhausting hole means, thereby to exhaust the gas from said hollow bag body through said exhausting hole means by releasing said blocking member from blocking said opening of said exhausting hole means, whereby the pressure of the gas in said hollow bag body and rebounding force of said hollow bag body against said occupant is remarkably reduced at the moment when the occupant is thrown against said inflated bag body in a sudden stop of the moving apparatus.

Another object of the present invention is to provide a novel gas bag of simple and compact construction for practical use.

DESCRIPTION OF THE DRAWINGS

The embodiments of the present invention will be explained with the annexed drawings. Tjhe embodiments will be mainly explained relative to the improvement of the construction of the gas bag itself rather than the conventional gas bag system. The devices except the said gas bag itself, such as the source for supplying the high pressure gas into the gas bag, the shock detector including the command transmitting system for initiating inflation of the gas bag by means of packing or inserting the high pressure gas supplied from the high pressure gas supplying source into the gas bag through a supply path are constructed in accordance with known techniques.

FIGS. 4 and 5 are isometric views similar to FIG. 3A but showing second and third embodiments respectively of the present invention; and FIG. 6 is an isometric view, partially in sections, of a fourth embodiment of the invention.

Figure 1:
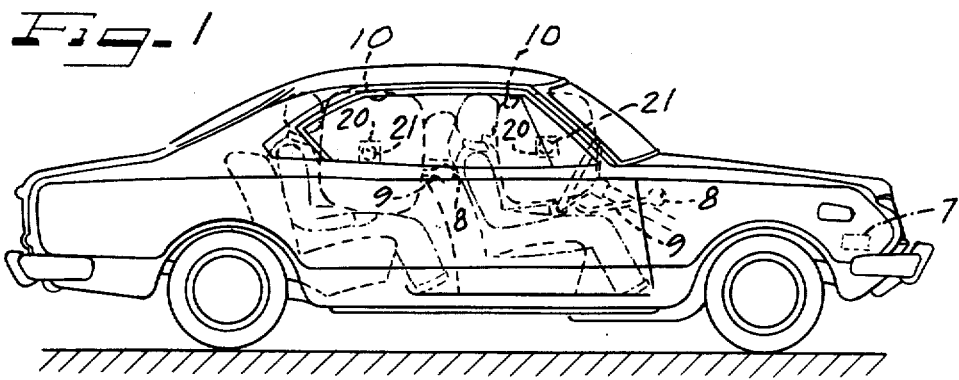
FIG. 1 is a side-elevational view of an automobile incorporating the invention.
Figure 2:
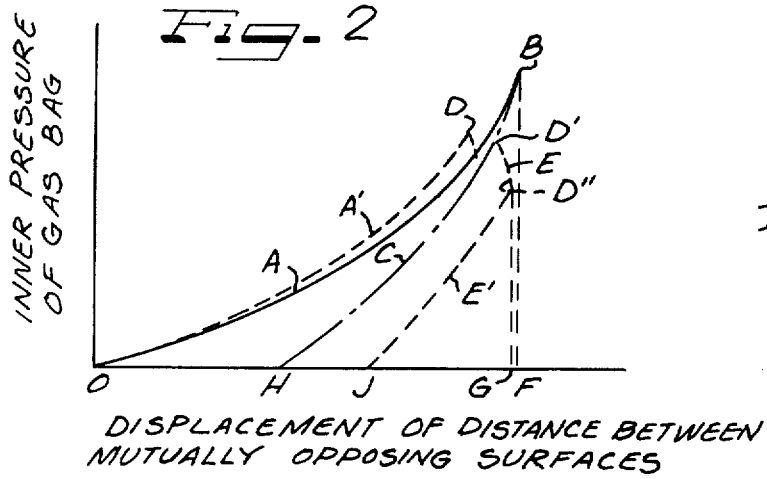
FIG. 2 is an explanatory graph.

The construction of the gas bag is explained in the free inflated condition in order that persons skilled in the art will be able to understand easily the present invention. Thus, the gas bag shown in the figures is not in the condition of being deflated and housed, but is in the nearly-inflated condition in which the bodies of the occupants have not yet touched and pressed the gas bag.

For convenience, the respective axes passing through the nearly central part of the hollow inner part and the respective sealed wall surfaces in the free inflated condition of the gas bag will be termed as follows:

X axis: an axis line passing through the central part of the hollow inner part of the gas bag (the gas bag is mounted on the vehicle so that this X axis line is nearly parallel to the moving direction of the occupant to the bag body when the occupant touches and presses the bag body toward the moving direction under the influence of inertial force.)

Y axis: the axis line passing generally vertically through the central part of the hollow inner part of the gas bag crossing perpendicularly the said X axis.

Z axis: the axis line passing through the central part of the hollow inner part of the gas bag and crossing perpendicularly the respective axis lines of the said X axis and Y axis.

front panel I: the front wall surface of the gas bag generally perpendicular to the direction of X axis, and in the front side relative to the moving direction of the vehicle.

back panel II: the rear wall surface opposite the front panel I in nearly parallel relation thereto (namely, it is contacted directly by the bodies of the occupants).

left side panel III: the side wall surface generally parallel to the direction of Y axis, and in the left side of the moving direction of the vehicle.

right side panel IV: the side wall surface opposite the left side panel and generally parallel thereto.

top panel V: the generally horizontal wall surface generally parallel to the X axis and in the upper side relative to the moving direction of the vehicle.

bottom panel VI: the bottom wall surface opposite the upper side panel and nearly parallel relative thereto.

DETAILED DESCRIPTION

The first embodiment of the present invention will be explained with reference to FIG. 1, and FIG. 3A to FIG. 3D. The respective panels I to VI of the gas bag 10 of the first embodiment are made of nylon filament woven fibers, having substantially no air permeability and elasticity which is the same as the material employed in prior conventional gas bags. The tensile strength of the fabrics is about 30 kg/cm both in the warp and weft directions. Nylon yarns of 210 denier made of 24 filaments are used both for warps and wefts. The number of ends and picks per inch is both 58. Tne front panel I, the back panel II, the top panel V and the bottom panel VI are formed by bending a piece of said fabrics and sewing both edge ends 12 thereof in its longitudinal direction together as shown in FIG. 3C. And the peripheral edge ends 11 of left side panel III and the right side panel IV are sewn together with those of said piece of fabrics forming panels I, II, V and VI as shown in FIG. 3B.

Figure 3B:
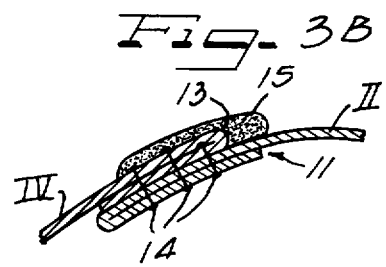
FIG. 3B is a sectional view of a seam of the air bag taken along line IIIB—IIIB of FIG. 3A.
Figure 3C:
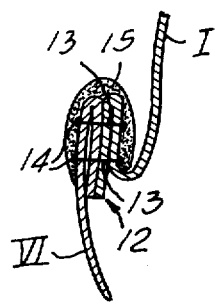
FIG. 3C is a sectional view of another seam of the air bag taken along the line IIIC—IIIC of FIG. 3A.

As shown in FIGS. 3B and 3C, the seam is made of two rows of lock stitches 14 (eight stitches per inch) formed by nylon 8s count thread for joining fabrics II and IV or I and VI in parallel to the edge 11 or 12. The filler treatment is processed on the respective seams 14 of the outer wall surface of the said hollow bag body with the coating material 15 of chloro-sulfonation polyethylene, so that the inner part of the hollow bag body of the gas bag 10 may be in a good air tight condition. And also, as shown in FIG. 3D, the high pressure gas introducing tube 16 is fixed to the bottom panel VI of the gas bag 10 through the bracket 17 and the sealing member 18 with fixing members 19 such as bolts and nuts in one body to be in good air tight condition so that the hollow bag body may be connected to a high pressure gas container 8 via the high pressure gas supplying path 9. The structure described above is equal to that of a conventional gas bag. The feature of the present invention exists in the structure that at least one gas exhausting hole is provided at the hollow bag body and at least one restraining member connected or formed in one body with at least one blocking member for blocking the said hole are constructed in the hollow bag body of the gas bag. The said feature will be explained hereafter.

Figure 3A:
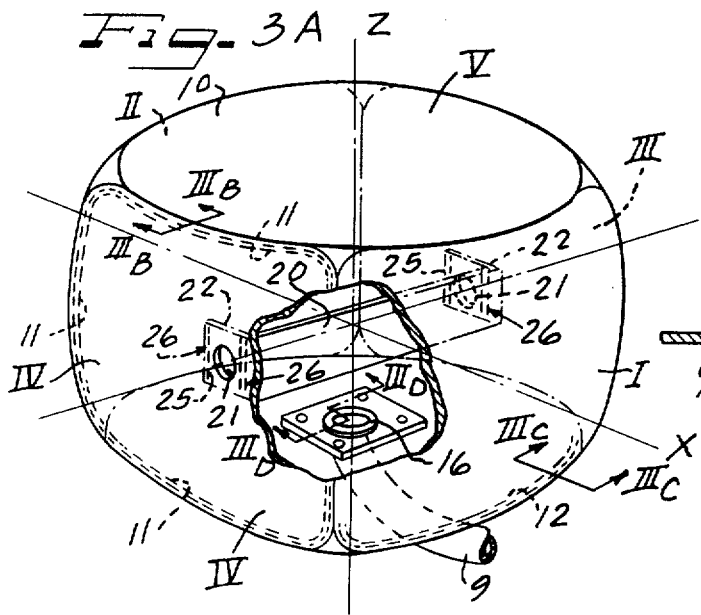
FIG. 3A is a generally isometric view of an air bag including one embodiment of the invention.
Figure 3D:
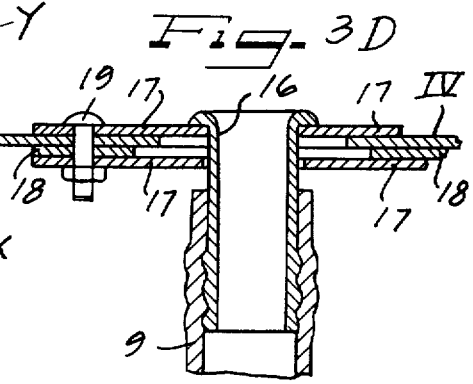
FIG. 3D is a sectional view of the gas connection taken along line IIID—IIID of FIG. 3A.

In case of the first embodiment of the present invention, as shown in FIG. 3A, the gas exhausting holes 21 are made open at the nearly central part of the walls of the both left and right side panels III, IV of the hollow bag body of the gas bag 10. The central axis of the said holes 21 corresponds to axial center of Y axis crossing the said left and right side panels III, IV. A web or strip type member 20 is made of the same woven fabrics having substantially no air permeability and elasticity, as the gas bag 10, and it is disposed in the condition that the surface in the transversed direction is made to be at a right angle relative to X axis, and its longitudinal direction to be parallel relative to Y axis. Both end parts in the longitudinal direction of the strip 20 are bent at about a right angle from the front panel side toward the back panel side, and thus form the bent end parts 22. These bent end parts 22 are respectively constructed on the inner wall surfaces at the left and right side panels III and IV in such a way that the respective gas exhausting holes 21 are blocked with these bent end parts 22. The strip 20 has a length which is a little shorter than the length of one side of the panels of the gas bag 10. In other words, in this embodiment, the strip 20 operates as the restraining member of the gas bag 10 in the free inflated condition, and the bent end parts 22 formed in one body with the restraining member 20, operate as valve members 22 for closing the gas exhausting holes 21.

The blocking of the gas exhausting holes 21 by the blocking members 22 of this embodiment will be explained in more detail as follows. As shown in FIG. 3A, the blocking members 22 are integral with the restraining member 20, and are formed as bent ends thereof. The respective left and right side panels III, IV are sewn together with the nylon threads 25 so that the rows of stitches 26 are formed in the transverse direction (Z direction) of the blocking members at the peripheral part of the respective gas exhausting holes 21. Two rows of stitches are formed at the root side of the bent end part and one seam line is formed at the top end side of the bent end part.

The tensile strength and the width size of the restraining member 20 and the blocking members 22 are designed as follows. At first the predetermined inner pressure (about 0.4~0.5 kg/cm²) of the gas bag 10, in the case of deformation of gas bag 10 along X axis, and the area of the left side panel III or that of the right side panel IV is calculated as the limit required to peel the blocking members 22 of the restraining member 20 from the hollow bag body. The blocking members are produced so that at the time when a tensile force, larger than the said predetermined value, is applied to the restraining member 20, the blocking members 22 are peeled from both the left and right side panels III, IV of the hollow bag body, which causes the gas exhausting holes 21 to be opened. The rows of stitches 26 exposed at the outer wall surfaces of the bag body are given a filler treatment with a coating material so that the inner part of the hollow bag body of the gas bag 10 is made to be in the condition of good air tight from its outer part.

The gas bag including the construction described above is, in the usual case, mounted in a folded condition in a high speed moving vehicle such as the automobile. The gas bag is mounted so that X axis nearly coincides with the moving direction of said vehicle in the free inflated condition.

In case of a sudden stop of the vehicle, the shock detector 7 is operated, and high pressure gas is introduced into the bag body from a high pressure gas container through the gas introducing tube 16, thus causing the gas bag 10 to be inflated. When the bodies of the occupants are thrown in the direction of movement of the vehicle, the occupants under the influence of inertial force, press the back panel II of the gas bag 10. At this time, the front panel I of the gas bag 10 contacts a portion of the vehicle such as the dash board, thus preventing the gas bag 10 from moving in the direction of the vehicle movement. Therefore, the distance between the front panel I and the back panel V is decreased as the gas bag 10 is pressed in the direction of X axis, which causes the bag body to be deformed. This in turn, causes the gas pressure of its inner part to be raised.

In the hollow bag body of the gas bag 10 of the first embodiment, the restraining members 20 are constructed connecting the left side panel III and the right side panel IV, so that the deformation of the gas bag 10 and the raising of the gas pressure increases the force tending to stretch the restraining members 20 in their longitudinal direction.

But this restraining member 20 is designed and produced so that the blocking members 22, which are sewn in one body with the hollow bag body and by which the gas exhausting holes 21 are blocked, are peeled from the said hollow bag body when the predetermined tensile force is applied to the restraining member 20. As the gas bag is deformed, pressed by the occupant, the inner pressure of the gas bag is increased to reach said predetermined gas pressure. When the value of the tensile force applied to the restraining member 20 exceeds this predetermined value, the rows of stitches by which the bent end parts 22 forming the blocking members are connected with the wall surface of the hollow bag body, are broken in the order from that nearest to the root of the bent part toward that near the gas exhausting hole 21, and then the blocking members 22 are peeled from the wall surfaces of the hollow bag with exception of the top end of the bent part. These stages are processed in an instant.

As a result, the high pressure gas in the gas bag body 10 is exhausted outwardly through the gas exhausting hole 21 which has been opened in the process. The gas pressure in the bag body 10 is thus lowered. Therefore, the energy by which the occupants are rebounded based on the rebounding force of the gas bag 10 is reduced. Moreover, in case of this embodiment, as described before, when the sewing thread is cut in the process so that the blocking members 22 are peeled from the wall surfaces of the hollow bag body because of the stretching operation of the restraining member 20, energy also is consumed. Therefore, the energy of the gas bag 10 tending to rebound the occupants is effectively reduced.

In this first embodiment, the restraining member 20 is constructed in such a manner that its surface in the transverse direction is at approximately a right angle relative to the X axis. The bodies of the occupants contact the gas bag 10 and cause it to be deformed in the direction of the X-axis, and then the tensile force is applied to the restraining member 20. When this tensile force exceeds the predetermined value, two rows of stitches connecting the blocking members 22 of the restraining member 20 with the wall surfaces of the hollow bag body, at the root of the bent parts, are cut off one by one, nearly in an instant, and at the same time. Thus, the blocking members 22 are instantly peeled from the wall surfaces of the hollow bag body. Therefore, the tensile force when peeled can be determined.

A second embodiment of the present invention will now be explained with reference to FIG. 4. The gas bag 10a of this second embodiment, is provided with gas exhausting holes 21 at the nearly central part of both the left and right side panels III, IV of the hollow bag and the said gas exhausting holes 21 are blocked with the blocking members 31 formed in one body with a restraining member 30. The gas bag of the second embodiment differs from that of the first embodiment as follows. Namely, the restraining member 30 (some parts of this restraining member operate as the blocking members), is formed into an endless belt type which continuously connects the left side panel III, top panel V, the right side panel IV, and the bottom panel VI, in the inner part of the hollow bag body.

With respect to the gas bag 10a of the second embodiment, the surface in the transverse direction of the cloth piece 30 is made of material similar to that of the first embodiment and is located parallel to the X axis. The piece 30 is provided in the inner part of the hollow bag body in the manner that the longitudinal direction of the cloth piece 30 lies in the plane including the Y axis and the Z axis. The first bent parts 31 are formed at the mutually opposing surfaces of the cloth piece 30 crossing the Y axis. And the gas exhausting holes 21, provided at the inner wall surfaces of the said both the left and right side panels III, IV, are blocked with the said first bent parts 31. the second bent parts 32 are formed at the mutually opposing surfaces of the said cloth piece 30 crossing the Z axis. The second bent parts 32 are connected to the inner wall surfaces of the top and bottom panels V, VI of the hollow bag body, and the cloth surfaces 33 connecting the first and the second bent parts 31, 32 of the cloth piece 30 are disposed so that they cross the edge parts respectively formed with the top and bottom panels V and VI, and the left and right side panels III and IV, in three dimensions. The total length of the cloth piece 30 is made shorter than the length of the line connecting the connecting points relative to the hollow bag body of the cloth piece 30 to the hollow bag body in the free inflated condition along the wall surfaces of the said hollow bag body. The cloth piece 30 of the second embodiment is employed as the restraining member of the gas bag 10, and the first bent parts 31 of the cloth piece 30 are employed as the blocking members 31 for the gas exhausting holes 21.

As shown in FIG. 4, the blocking members 31, which are the first bent parts formed in one body with the restraining member 30, and with the respective left and right side panels III, IV, are sewn together, at the peripheral parts of the respective gas exhausting holes 21 with the nylon threads 25 so that two rows of stitches 26 are formed in a transverse direction (X axis direction) of the blocking members 31. The second bent parts 32 formed in the restraining member 30 and the nearly central parts of the respective top and bottom panels V and VI, are sewn together in the transverse direction (X axis direction) of the second bent parts with the nylon threads 25', to form two rows of stitches at a suitable interval. The tensile strength of the sewing threads 25' employed for the second bent parts 32 is stronger than that of the sewing threads 25 for connecting the said blocking members 31 with the panels. The blocking members 31 are constructed in such a way that when the tensile force, larger than a predetermined value, is applied in the longitudinal direction of the restraining member 30, the sewing threads 25 are cut in order between the first bent parts 31 and the panels.

The gas bag 10a of the second embodiment is thus constructed in such a way that when a predetermined tensile force is applied to the restraining member 30, only the blocking members 31 are peeled from the wall surfaces of both the left and right side panels III and IV, while on the other hand, the second bent parts 32 of the restraining member 30 are not peeled from the top and bottom panels V and VI. Hence, as the gas bag 10a is deformed by the pressing of the occupant in the moving direction of the vehicle, and the inner pressure of the gas bag 10a is increased to reach the predetermined gas pressure. At the time when the tensile force applied to the restraining member 30 becomes larger than this predetermined value, of the first and second bent parts 31 and 32, only the sewing threads 25, are cut, and the blocking members 31 are peeled from the wall surfaces of the hollow bag body, while the rows of stitches formed in the second bent parts 32 remain. The said steps occur almost instantaneously.

As a result, the high pressure gas in the hollow bag body of the gas bag 10a is exhausted outwardly through the gas exhausting holes 21 which have been opened, and the gas pressure in the bag body 10 is lowered. Thus, the energy to rebound the occupants is reduced. As apparent from the above description, the blocking members 31 are peeled from the wall surfaces of the hollow bag body due to the stretch of the restraining member 30. In the said step, the energy of the gas bag rebounding the occupants can be consumed, and also the energy thereof is reduced in the gas exhausting process from the inner part of the bag body. The energy is thus reduced effectively and smoothly as in the case of the first embodiment.

With respect to the gas bag 10b of the third embodiment shown in FIG. 5, the gas exhausting holes 21 are located at the nearly central part of the walls of the top and bottom panels V and VI. The gas exhausting holes 21 are blocked by first bent parts 41 formed at one end of one pair of the strip type cloth pieces which are made of the same material as in the first embodiment, and are also disposed in the plane including the Y axis and the Z axis in the inner part of the hollow bag body. The first bent parts 41 of the cloth pieces 40 are respectively sewn in one body on the top and bottom panel V and VI in order to block the said gas exhausting holes 21. The second bent parts 42 formed at the other end parts of the both the left and right side panels III and IV are respectively sewn together in one body. The cloth pieces 40 are constructed in the hollow bag body in such a manner that the nearly central parts of the cloth surfaces thereof cross the edge parts which are formed by the left and right side panels III and IV and the top and bottom panels V and VI in three dimensions. The length of the cloth pieces 40 is made to be shorter than the length of the line connecting the joining points of the cloth pieces 40 relative to the hollow bag body along the wall surface of the said hollow bag body in the free inflated condition. In the case of the third embodiment, the cloth pieces 40 are employed for the restraining members in the free inflated condition of the gas bag 10b. Out of the first and second bent parts 41 and 42 formed at the both end parts of the cloth pieces 40, only the first bent parts 41 operate as the peeling parts when the tensile force larger than the predetermined value in the longitudinal direction of the cloth pieces 40 due to the pressing of the occupant applied in the direction of X axis. In the case of the third embodiment, the first bent parts formed in one body with the restraining members 40 are employed as the blocking members for the gas exhausting holes 21.

The blocking mode of the gas exhausting holes 21 by the said blocking members 41 and the construction of the restraining members 40 relative to the hollow bag body will now be explained in more detail. As shown in FIG. 5, two blocking members 41 and the top and bottom panels V and VI are sewn together with nylon threads 25 around the peripheral parts of the respective gas exhausting holes 21 so that the row of stitches 26 are formed in the transverse direction (the direction of the X axis) of the blocking members 41, and also, the second bent parts 42 formed at the other end of the restraining members 40 and the nearly central part of the left or right side panels V and VI are respectively sewn together with the nylon threads 25, to form three rows of stitches 26' in the transverse direction (the direction of the X axis) of the second bent parts 42, at a suitable interval one to the other. The tensile strength of the sewing threads employed for the said second bent parts 42 is stronger than that of the sewing threads 25 connecting the said blocking members 41 with the top and bottom panels V and VI. The blocking members 40 are designed and sewn on panels so that the sewing threads 25 are cut in order when a tensile force, larger than the predetermined value, is applied in the longitudinal direction of the restraining members 40.

When the predetermined tensile forcer larger than the predetermined value is applied in the longitudinal direction of the restraining members 40 due to the pressing of the occupant against the hollow bag body along the X axis, the blocking members 41, which are sewn in one body on the hollow bag body for blocking the gas exhausting holes 21, are peeled from the surfaces of the top and bottom panels V and VI, and on the other hand, the second bent parts 42 of the restraining members 40 remain as they were connected to the hollow bag body. When the tensile force applied to the restraining members 41 is increased to reach the predetermined value, the sewing threads 25, ith which the blocking members 41 are respectively sewn on the top and bottom panels V and VI, are cut, the blocking members 41 are peeled from the peripheral parts of the gas exhausting holes 21. Thus, the energy of the gas bag rebounding the occupant can be consumed in the peeling process of the said blocking members 41. And at the same time, the high pressure gas is exhausted outwardly from the inner part of the hollow bag body through the gas exhausting holes 21. The inner pressure of the gas bag 10b is lowered, and then the energy rebounding the occupant is reduced still more. Thus, energy can be absorbed effectively and smoothly as is the case of the first embodiment.

In the first, second and third embodiments, a nearly cubic shape gas bag is provided with the restraining members therein. In the fourth embodiment of the present invention, a cylinder shape gas bag is provided with a restraining member on the outer side thereof. This is illustrated in FIG. 6.

The hollow cylinder type gas bag 10c of the fourth embodiment is composed of a front panel Ia (the circular wall surface provided substantially perpendicular to the direction of the X axis, situated on the front side relative to the moving direction of the vehicle), and the back panel IIa (the circular wall surface opposite to the front panel Ia, in the nearly parallel relation to each other, namely, directly opposing the bodies of the occupants. The edges of the side panel VII connect with the both panels Ia and IIa. The material of the panels is similar to that of the other embodiments. The connections between the respective panels, the provision of the high pressure gas introducing hole, and the respective X-, Y- and Z-axes passing through the nearly central part of the hollow inner part of the bag, are similar to those of the preceding embodiments.

In the case of the gas bag 10c of the fourth embodiment shown in FIG. 6, two gas exhausting holes 21 are made open at the mutually opposing wall surfaces along the Z axis of the side panel VII. The gas exhausting holes 21 are blocked with one pair of the ring type cloth pieces 50 which are made of the nylon filament similar to that of the first embodiment, and are disposed along the outer peripheral wall surface of the hollow bag body in the plane including the Y axis and the Z axis. The respective end parts, in the longitudinal direction of the said cloth pieces 50, are bent at about a right angle relative to the longitudinal direction, and the end parts are mutually facing each other and secured by nylon threads 25 with plural rows of stitches 26 formed along a direction transverse (the direction of Y axis), and thus the facing parts 51 are formed. The said facing parts 51 are fixed in the peripheral parts of the gas exhausting holes 21 to the wall surface of the bag body in order to block the said holes 21, and also the cloth pieces 50 are respectively sewn in one body on the opposing outer wall surface along the Y axis of the side panel VII. The length of the said cloth pieces 50 when constructed is made to be shorter than the length of the line connecting the joining points of the hollow bag body relative to the cloth pieces 50 along the outer wall surface of the hollow bag body in the freely inflated condition (because in case of the fourth embodiment, the inner diameter of the side panel, is originally equal to the inner diameter of the front and back panels). Plural tack parts are formed in the inner wall surface itself of the side panel, when the cloth pieces whosee diameter is smaller than that of the said side panel are provided. In the fourth embodiment, the cloth pieces 50 are employed as the restraining members for restraining the free deformation of the gas bag 10c. Also, the facing end parts 51 of the said cloth pieces 50 are designed due to the pressing of the occupant and are constructed to become slit parts which are split when the tensile force larger than the predetermined value is applied in the longitudinal direction of the cloth pieces 50 due to the pressing of the occupant against the hollow bag body. In the fourth embodiment, the facing parts 50 are employed as the blocking members of the gas exhausting holes 21.

The blocking mode of the gas exhausting holes 21 with the said blocking members 51 and the construction of the restraining members 50 relative to the outer wall surface of the hollow bag body will be explained in detail. The blocking members 51 are connected in one body with the outer surface of the side panel VII with the adhesive material, at the peripheral part of the respective gas exhausting holes 21. The restraining members 50 are sewn on the cloth surface of the side panel VII at the opposing portions along Y axis with the nylon threads 25' so that two rows of stitches 26' are formed in the transverse direction (the direction of X axis) of the restraining members 50, at a suitable interval. The blocking members 51 are designed and sewn on the bag body so that the sewing threads 25 are cut in order at the facing parts when a tensile force larger than the predetermined value is applied to the restraining members 50 in the longitudinal direction.

In the case of the fourth embodiment, when the tensile force, applied to the restraining members 50, is increased to reach the predetermined value, the sewing threads 25 of the facing parts 51 (the blocking members) formed at the restraining members 50 are cut, and the facing parts 51 are stretched to be in the split condition (in case of the present invention, this kind of change of the blocking members of the restraining members is also called peeling), and thus, the gas exhausting holes 21 are opened. As a result, the high pressure gas in the hollow bag body of the gas bag 10c is exhausted outwardly through the gas exhausting holes 21 and the gas pressure in the said bag body is lowered, and therefore, the energy of the body rebounding the occupant, caused by the rebounding force of the gas bag 10c, can be reduced. As described before, when the blocking members 51, formed in the restraining members 50 are split, the energy operating as the rebounding force of the gas bag 10c to the occupant is consumed. Moreover, the reduction of energy can be carried out in the inner pressure lowering process by exhausting the inner gas of the bag body through the gas exhausting hole inner part of the bag body. Thus, the energy can be reduced effectively and smoothly as in the said first embodiment. And besides, in case of the fourth embodiment, the restraining members 50 are constructed on the outer wall surface of the hollow bag body, so that the tensile force is applied to the overall surface of the restraining members 50 when the hollow bag body is deformed due to the pressing of the occupant. Therefore, the energy absorbing effect can be obtained more certainly in this case, since the pressing direction of the occupant is not limited to the direction of the X axis.

In summary, the present invention relates to a gas bag employed for a gas bag device which is attached to a high speed moving vehicle such as an automobile or the like in a folded condition, and into which high pressure gas is introduced by means detecting a sudden stop of the moving vehicle, in order to protect the occupants. It is characterized in that a hollow bag body is formed of sheet material of substantially no air permeability and elasticity, provided with a gas introducing hole for connection with a high pressure gas supplying source and having at least one gas exhausting hole passing through the wall of the said bag body located at some portions different from the portion where the said gas introducing hole is disposed. Blocking members made of the material of substantially no air permeability and elasticity are provided so as to block the said hole in the air tight condition and are arranged to be peeled when a predetermined force is applied. A restraining member is also provided, one end of which is connected or formed as one body with the blocking member, and is connected with a suitable portion of the wall of the hollow bag body at the other end thereof, and the length of the restraining member being made shorter than the distance along the wall surface of the bag body connecting the joining points of both ends of the restraining member in the free inflated condition of the hollow bag body. When the hollow bag body is deformed after the high pressure gas is introduced into the said bag, the tensile force operating on the restraining member exceeds a predetermined value, the blocking member is peeled from the hollow bag body and the gas exhausting hole is opened. The rebounding force on the occupant is reduced because of the lowering of the inner pressure of the hollow bag body, and the rebound of the occupant can be remarkably prevented. The efficiency of energy absorption is very good. Hence, the occupant can be prevented from colliding against the inner structures of the vehicle.

With respect to the blocking members blocking the gas exhausting holes and the restraining members connected or formed in one body with the said blocking members of the present invention, the limit value of the tensile force by which the blocking members are not peeled from the wall surface of the hollow bag body, applied to the restraining members can be controlled at will, by selecting suitably the form, length, width and number of the blocking members and of the restraining members, sewing the blocking members, such as the type of row of stitches, the pitch, width, number of the stitch, and the sort of the sewing thread.

In case of the present invention, it is sufficient that at least one gas exhausting hole is provided. Besides this, for example, plural slits may be arranged and distributed in the wall surface of the hollow bag body. When the high pressure gas in the hollow part of the gas bag is exhausted through the gas exhausting holes, the exhausting amount of the high pressure gas can be controlled at will by changing the diameter and the number of the gas exhausting holes and of selecting the combination of their arrangement and distribution. So, it is very useful on the point of designing and producing the gas bag according to the using condition thereof to take into account the body position of the occupant and the like.

Although certain specific embodiments of the invention have been shown and described, it is obvious that many modifications thereof are possible without departing from the spirit and scope of the invention. The invention, therefore, is not intended to be restricted to the exact showing of the drawings and description thereof, but is considered to include reasonable and obvious equivalents. In case of the said respective embodiments, for example, the blocking members and the restraining members are respectively formed of the strip type cloth pieces, but besides this, plug means, cover means and the like can be employed for the blocking members. Line type members, plane type members and the like can be used for the restraining members without being limited to the cloth pieces. In this case, it is possible to connect the blocking members such as the plug means and the like with the respective panels of the hollow bag body by means of the restraining members such as line type members. Also the blocking members may be connected in one body through the restraining members, and restraining members provided with the blocking members may be connected together with the other connecting members. If the device is constructed so that the tensile force is applied to the restraining members when the hollow bag body is deformed by the occupant, the arbitrary operating situation can be employed such that the blocking members are pulled out of the gas exhausting holes when the tensile force reaches the predetermined value.

The preceding embodiments were explained about the cubic shape gas bag and the cylinder shape one, but the present invention can be embodied about the arbitrary type gas bag such as an elliptic one, and a spherical one. The material of the blocking members and that of the restraining members are not limited to the nylon filament material embodied in the preceding embodiments, and besides the said material, macro molecular film such as polyethylene and inorganic fiber such as glass fiber can be employed too. And as the material of the restraining members, knit fabric and braid fabric may be employed. And in the respective embodiments, the connection of the restraining members and the respective panels and the connection of the blocking members and the respective panels at the peripheral parts of the gas exhausting holes are carried out to form rows of stitches with the sewing threads, but besides the said operation, the connection can be performed by means of adhesives such as magic tape, fasteners, snaps and the like.

The preceding embodiments have been explained about the operating processes of the gas bag device in the case of the collision of an automobile, as, for example, by a sudden stop.

In the present invention, the sudden stop implies not only that in the case of the collision of the moving apparatus such as the automobile, but that by which the bodies of the occupants are in danger of being thrown against the structural parts and bodily harmed.

The gas introducing hole is provided in a wall surface of the bottom panel in the preceding embodiments. It is equally possible to provide it in other wall surface of the bag body in accordance with the shape and the installing position of the bag body.

The gas bag of the present invention can be also applied to a gas bag device for preventing the occupant from the collision to the side of the high speed moving apparatus such as the automobile. In this case, the gas bag is attached to the door panel, the side board and the like in the moving apparatus so that the X axis of the gas bag is made to be coincident with the direction of the said apparatus, perpendicular to the moving direction thereof, and the restraint members of the gas bag are constructed to be nearly parallel to the moving direction of the apparatus.

What is claimed is:

1. A gas bag employed for a gas bag device which is attached to a high speed moving apparatus such as an automobile and the like in the folded condition, and into which high pressure gas is introduced to be packed in order to protect occupants of said high speed moving apparatus by detecting the sudden stop of said moving apparatus, said gas bag comprising:
   a hollow bag body formed of sheet material having substantially no air permeability and elasticity;
   a gas introducing hole means provided at a portion of said hollow bag body connecting with a high pressure gas supplying source;
   at least one exhausting hole means having a predetermined area of an opening provided at a portion of said hollow bag body different from the portion where said gas introducing hole means is provided;
   at least one restraining member engaging said hollow bag body for restraining the free deformation of said hollow bag body due to the pressing of the occupant thereto in the inflated condition; and
   at least one blocking member made of material having substantially no air permeability blocking said opening of said exhausting hole means in such a manner that the gas can not escape from said hollow bag body through said opening of said exhaust hole means,
   said blocking member being connected to said restraining member and being released from blocking said opening of said exhaust hole means by being pulled by said restraining member when the tensile force, larger than a predetermined value, is applied to said restraining member due to the pressing of the occupant to said hollow bag body,
   whereby, to exhaust the gas from said hollow bag body through said exhausting hole means by releasing said blocking member from blocking said opening of said exhaust hole means and remarkably to reduce the pressure of the gas in said hollow bag body and a rebounding force of said hollow bag body against said occupant in a moment of said occupant pressing to said inflated bag body in the sudden stop of said moving apparatus.

2. A gas bag according to claim 1, wherein said hollow bag body is formed into a cubic shape.

3. A gas bag according to claim 1, wherein said hollow bag body is formed into a cylindrical shape.

4. A gas bag according to claim 1, wherein said hollow bag body is formed into an elliptic shape.

5. A gas bag according to claim 1, wherein said restraining member is provided within said hollow bag body in such a manner that both end portions of said restraining member are respectively fixed to a wall surface of said hollow bag body and another wall surface opposing thereto, the length of said restraining member being formed to be shorter than the distance between said wall surfaces opposing against each other in the free inflated condition of said hollow bag body.

6. A gas bag according to claim 5, wherein said restraining member is formed of a line shape member which is designed to have a predetermined value in the tensile strength.

7. A gas bag according to claim 5, wherein said strip type restraining member is made of filament woven fabrics and, said strip type blocking member is fixed to said portion of said hollow bag body where said gas exhausting hole means is provided, by sewing them together with threads in order to block said opening of said at least one exhausting hole means, said sewn portion with said threads of said strip type blocking member and said hollow bag body is designed to have a predetermined value in the tensile strength and is broken by a predetermined tensile force of said restraining member.

8. A gas bag according to claim 7, wherein said hollow bag body is formed into a cubic shape.

9. A gas bag according to claim 8, wherein said gas exhausting hole means is two gas exhausting hole means which are provided respectively in the mutually opposed surfaces of said hollow bag body, said retraining member and said blocking member being formed in one body of one strip type member made of nylon filament woven fabrics, said strip type member being disposed in said hollow bag body in such a manner that the thickness direction of said strip type member coincides with the pressing direction of said occupant to said hollow bag body, and both end parts in the longitudinal direction of said strip type member are bent at about a right angle and are sewn respectively on said mutually opposed surfaces of said hollow bag body with nylon threads to form the plural rows of stitches in the transverse direction thereof in order to block said opposed openings of said two exhausting hole means.

10. A gas bag according to claim 8, wherein said gas exhausting hole means is two gas exhausting hole means which are provided respectively in the mutually opposed surfaces of said hollow bag body, said retraining member and said blocking member being formed of one strip type member made of nylon filament woven fabrics, said strip type member being disposed in said hollow bag body in such a manner that the transverse direction of said strip type member coincides with the pressing direction of said occupant to said hollow bag body, and said strip type member being bent into a ring belt having a cross section of a diamond shape and sewn respectively to four wall surfaces of said hollow bag body at their central portions with nylon threads to form the plural rows of stitches in the transverse direction thereof in order to block said opposed openings of said two exhausting hole means and support said strip type member to said wall surfaces of said hollow bag body.

11. A gas bag according to claim 8, wherein said gas exhausting hole means is two gas exhausting hole means which are provided respectively in the mutually opposed top and bottom surfaces of said hollow bag body, said two restraining members and said blocking member being formed of two strip type members made of nylon filament woven fabrics, said strip type members being disposed in said hollow bag body in such a manner that the transverse direction of said strip type members coincides with the pressing diretion of said occupant to said hollow bag body, and said strip type members being bent and sewn on respective top wall surface and side wall surface, bottom wall surface and side wall surface of said hollow bag body with threads to form the plural rows of stitches in the transverse direction thereof in order to block said opposed openings of said two exhausting hole means with said bent ends of said strip type members and support said other bent ends of said strip type members to said opposed top and bottom wall surfaces of said hollow bag body.

12. A gas bag according to claim 1, wherein said restraining member is equipped on the outer surface of said hollow bag body in such a manner that said restraining member is shaped as a ring like band along a wall surface of said hollow bag body, the total length of said restraining member along said hollow bag body being formed to be shorter than the length of external circumference of said hollow bag body in free inflated condition.

13. A gas bag according to claim 12, wherein said strip type restraining member is made of filament woven fabrics, and said strip type blocking member being fixed to said portion of said hollow bag body where said gas exhausting hole means is provided by sewing them together with threads, in order to block said opening of said at least one exhausting hole means, said sewn portion with said threads of said strip type blocking member and said hollow bag body being designed to have a predetermined value in the tensile strength and is broken by a predetermined tensile force of said restraining member.

14. A gas bag according to claim 3, wherein said hollow bag body is formed into a cylindrical shape.

15. A gas bag according to claim 14, wherein, said gas exhausting hole means is two gas exhausting hole means which are provided respectively in the mutually opposed top and bottom surfaces of said hollow bag body, said restraining member and said blocking member being formed of two strip type members made of nylon filament woven fabrics, said strip type members being provided around said hollow bag body by fixing inner surface of said strip type members to the outer wall surface of said hollow bag body where the two gas exhausting hole means are provided, with adhesive materials, and sewing each said portions of said restraining members together in such a manner that the transverse direction of said strip type members is parallel to the pressing direction of said occupant to said hollow bag body.

16. A gas bag according to claim 1, wherein said restraining member is formed of a strip type member which is designed to have a predetermined value in the tensile strength.

17. A gas bag according to claim 16, wherein said strip type restraining member is made of filament woven fabrics.

18. A gas bag according to claim 16, wherein said strip type restraining member is made of a macro molecular film.

19. A gas bag according to claim 16, wherein said strip type restraining member is made of an inorganic fiber.

20. A gas bag according to claim 1, wherein said restraining member is formed of a plane type member which is designed to have ia predetermined value in the tensile strength.

21. A gas bag according to claim 1, wherein said blocking member is formed of a strip type member which is made of filament woven fabrics and is designed to have a predetermined value in the tensile strength.

22. A gas bag according to claim 21, wherein said strip type blocking member is fixed to said portion of said hollow bag body where said gas exhausting hole means is provided, by sewing them together with threads in order to block said opening of said at least one exhausting hole means, said sewn portion with said threads of said strip type blocking member and said hollow bag body being designed to have a predetermined value in the tensile strength and is broken by a predetermined tensile force of said restraining member.

23. A gas bag according to claim 21, wherein said strip type blocking member is fixed to said portion of said hollow bag body where said gas exhausting hole means is provided with an adhesive material, said fixed portion with said adhesive material of said strip type blocking member and said hollow bag body is designed to have a predetermined value in the tensile strength and is broken by a predetermined tensile force of said restraining member.

24. A gas bag according to claim 23, wherein said fixed portion of said strip type restraining member and hollow bag body with an adhesive material is further sewed with threads in order to block said opening of said at least one exhausting hole means in the no air permeable condition effectively.

25. A gas bag according to claim 21, wherein said strip type blocking member is fixed to said portion of said hollow bag body where said gas exhausting hole means is provided with a magic tape, said fixed portion with said magic tape of said strip type blocking member and said hollow bag body being designed to have a predetermined value in the tensile strength and is broken by a predetermined tensile force of said restraining member.

26. A gas bag according to claim 1, wherein said blocking member is cover means.

27. A gas bag according to claim 1, further comprising a connecting means for connecting said restraining member and said blocking member.

* * * * *